United States Patent
Nakayama et al.

(10) Patent No.: US 11,978,850 B2
(45) Date of Patent: May 7, 2024

(54) SULFIDE SOLID ELECTROLYTE

(71) Applicant: Mitsui Mining & Smelting Co., Ltd., Tokyo (JP)

(72) Inventors: Yuki Nakayama, Ageo (JP); Takahiro Ito, Ageo (JP); Tsukasa Takahashi, Ageo (JP)

(73) Assignee: Mitsui Mining & Smelting Co., Ltd. (JP)

( * ) Notice: Subject to any disclaimer, the term of this patent is extended or adjusted under 35 U.S.C. 154(b) by 0 days.

(21) Appl. No.: 17/770,128

(22) PCT Filed: Dec. 11, 2020

(86) PCT No.: PCT/JP2020/046284
§ 371 (c)(1),
(2) Date: Apr. 19, 2022

(87) PCT Pub. No.: WO2021/117869
PCT Pub. Date: Jun. 17, 2021

(65) Prior Publication Data
US 2022/0359910 A1 Nov. 10, 2022

(30) Foreign Application Priority Data
Dec. 11, 2019 (JP) ................................. 2019-223968

(51) Int. Cl.
*H01M 10/0525* (2010.01)
*H01M 4/04* (2006.01)
(Continued)

(52) U.S. Cl.
CPC ..... *H01M 10/0562* (2013.01); *H01M 4/0407* (2013.01); *H01M 10/0525* (2013.01);
(Continued)

(58) Field of Classification Search
CPC ......... H01M 10/0525; H01M 10/0562; H01M 4/0407; H01M 2004/027; H01M 2004/028; H01M 2300/008
See application file for complete search history.

(56) References Cited

U.S. PATENT DOCUMENTS

2013/0323604 A1* 12/2013 Teshima ............... C01G 29/006
429/322
2014/0302382 A1* 10/2014 Kambara .......... H01M 10/0562
429/321
(Continued)

FOREIGN PATENT DOCUMENTS

CN 108292780 A 7/2018
JP 2016-024874 A 2/2016
(Continued)

OTHER PUBLICATIONS

Office Action for Japanese Patent Application No. 2021-517714 dated May 7, 2021 (8 pages).
(Continued)

*Primary Examiner* — Osei K Amponsah
(74) *Attorney, Agent, or Firm* — Harness, Dickey & Pierce, P.L.C.

(57) ABSTRACT

A sulfide solid electrolyte that can suppress the generation of hydrogen sulfide gas while maintaining the lithium ion conductivity; and an electrode composite material, a slurry and a battery, in each of which the sulfide solid electrolyte is used, are provided. The sulfide solid electrolyte contains lithium (Li), phosphorus (P) and sulfur (S) elements; at least one halogen (X) element; and at least one metal (M) element having a first ionization energy of more than 520.2 KJ/mol and less than 1007.3 KJ/mol, wherein, in an X-ray diffraction pattern measured with CuKα1 radiation, peaks are present at positions of 2θ=25.19°±1.00° and 29.62°±1.00°.

11 Claims, 4 Drawing Sheets

(51) Int. Cl.
H01M 10/0562 (2010.01)
H01M 4/02 (2006.01)

(52) U.S. Cl.
CPC .............. H01M 2004/027 (2013.01); H01M 2004/028 (2013.01); H01M 2300/008 (2013.01)

(56) References Cited

U.S. PATENT DOCUMENTS

| | | | |
|---|---|---|---|
| 2017/0040637 A1* | 2/2017 | Ceder | .................. C01B 17/22 |
| 2017/0187066 A1 | 6/2017 | Tsujimura et al. | |
| 2017/0222257 A1 | 8/2017 | Miyashita et al. | |
| 2017/0352916 A1 | 12/2017 | Miyashita et al. | |
| 2018/0069262 A1 | 3/2018 | Utsuno et al. | |
| 2018/0366779 A1 | 12/2018 | Katoh | |
| 2019/0140313 A1 | 5/2019 | Terai et al. | |
| 2019/0140314 A1 | 5/2019 | Utsuno et al. | |
| 2019/0221884 A1 | 7/2019 | Utsuno et al. | |
| 2019/0305371 A1 | 10/2019 | Utsuno et al. | |
| 2019/0312304 A1 | 10/2019 | Uesugi et al. | |
| 2020/0006808 A1 | 1/2020 | Utsuno et al. | |

FOREIGN PATENT DOCUMENTS

| | | |
|---|---|---|
| JP | 2017-117753 A | 6/2017 |
| JP | 2018-029058 A | 2/2018 |
| JP | 2018-045997 A | 3/2018 |
| KR | 2019-0051962 A | 5/2019 |
| WO | 2016-104702 A1 | 6/2016 |
| WO | 2018-003333 A1 | 1/2018 |
| WO | 2018-030436 A1 | 2/2018 |
| WO | 2018-047565 A1 | 3/2018 |
| WO | 2018-164224 A1 | 9/2018 |

OTHER PUBLICATIONS

Decision to Grant for Japanese Patent Application No. 2021-517714 dated Aug. 17, 2021 (5 pages).
International Search Report (in English and Japanese) issued in PCT/JP2020/046284, dated Mar. 2, 2021; ISA/JP (5 pages).
International Preliminary Search Report on Patentability issued in English for PCT/JP2020/04628 dated May 17, 2022 with translation of Written Opinion dated Mar. 2, 2021 (total 7 pages).
WPI / 2017 Clarivate Analytics; Database WPI Week 201863; Thomson Scientific, London, GB; AN 2018-71858W (total 3 pages).

* cited by examiner

SULFIDE SOLID ELECTROLYTE

CROSS REFERENCE TO RELATED APPLICATIONS

This application is a U.S. National Phase Application under 35 U.S.C. 371 of International Application No. PCT/JP2020/046284, filed on Dec. 11, 2020, which claims priority to Japanese Patent Application No. 2019-223968, filed on Dec. 11, 2019. The entire disclosures of the above applications are expressly incorporated by reference herein.

BACKGROUND OF THE INVENTION

Field of the Invention

The present invention relates to: a sulfide solid electrolyte; and an electrode composite material, a slurry and a battery, in each of which the sulfide solid electrolyte is used.

Background Art

A solid-state battery is characterized by being superior in production cost and productivity since a flammable organic solvent is not used and thus a safety device can be simplified, and by achieving high voltage when being stacked in series in a cell. In addition, it is expected that safety and durability can be improved since, in a sulfide solid electrolyte used for a solid-state battery, only lithium ions move and thus a side reaction due to movements of anions does not occur.

As a sulfide solid electrolyte, a sulfide solid electrolyte containing lithium (Li), phosphorus (P), sulfur (S) and halogen (X) elements and also containing a crystal phase having an argyrodite-type crystal phase has been known (for example, JP 2016-024874 A, WO 2016/104702 A, WO 2018/003333 A, WO 2018/030436 A, JP 2018-029058 A and JP 2018-045997 A).

A sulfide solid electrolyte has superior lithium ion conductivity, but has high reactivity with moisture. Consequently, when a lithium secondary battery is produced by using a sulfide solid electrolyte, the sulfide solid electrolyte is brought into contact with the atmosphere to react with atmospheric moisture, and as a result, toxic hydrogen sulfide gas may generate and the lithium ion conductivity may decrease.

An object of the present invention is to provide a sulfide solid electrolyte that can suppress the generation of hydrogen sulfide gas while maintaining the lithium ion conductivity. Another object of the present invention is to provide an electrode composite material, a slurry and a battery, in each of which the sulfide solid electrolyte is used.

SUMMARY

The present inventors have found that, if a sulfide solid electrolyte containing lithium (Li), phosphorus (P), sulfur (S) and halogen (X) elements and also containing a crystal phase wherein, in an X-ray diffraction pattern measured with CuKα1 radiation, peaks are present at positions of $2\theta = 25.19° \pm 1.00°$ and $29.62° \pm 1.00°$, is modified by partially substituting Li with a metal (M) element(s) having a first ionization energy of more than 520.2 KJ/mol and less than 1007.3 KJ/mol, this will make it possible to suppress the generation of hydrogen sulfide gas more greatly compared with the sulfide solid electrolyte before substitution while maintaining the lithium ion conductivity of the sulfide solid electrolyte before substitution, thus completing the present invention.

In other words, the present invention includes the following inventions.

[1] A sulfide solid electrolyte, containing:
lithium (Li), phosphorus (P) and sulfur (S) elements;
at least one halogen (X) element; and
at least one metal (M) element having a first ionization energy of more than 520.2 KJ/mol and less than 1007.3 KJ/mol,
wherein, in an X-ray diffraction pattern measured with CuKα1 radiation, peaks are present at positions of $2\theta = 25.19° \pm 1.00°$ and $29.62° \pm 1.00°$.

[2] An electrode composite material, containing the sulfide solid electrolyte according to [1] described above and an active material.

[3] A slurry, containing the sulfide solid electrolyte according to [1] described above and a dispersion medium.

[4] A battery, including a positive electrode layer, a negative electrode layer and a solid electrolyte layer located between the positive electrode layer and the negative electrode layer, wherein the solid electrolyte layer contains the sulfide solid electrolyte according to [1] described above.

The "first ionization energy" in the present invention can be the same as the first ionization energy described in "1. Atomic structure, Part I Foundations of Shriver & Atkins' Inorganic Chemistry (Volume 1) Fourth Edition", and thus the descriptions thereof are omitted here. The unit of the "first ionization energy" in the present invention is "KJ/mol", which is different from "eV", the unit of the first ionization energy described in "Resource section 2 of Shriver & Atkins' Inorganic Chemistry (Volume 1) Fourth Edition", but conversion can be performed using the equation of 1 eV=96.485 KJ/mol.

The present invention provides a sulfide solid electrolyte that can suppress the generation of hydrogen sulfide gas while maintaining the lithium ion conductivity; and an electrode composite material, a slurry and a battery, in each of which the sulfide solid electrolyte is used.

DETAILED DESCRIPTION

<<Sulfide Solid Electrolyte>>

Figure 1:
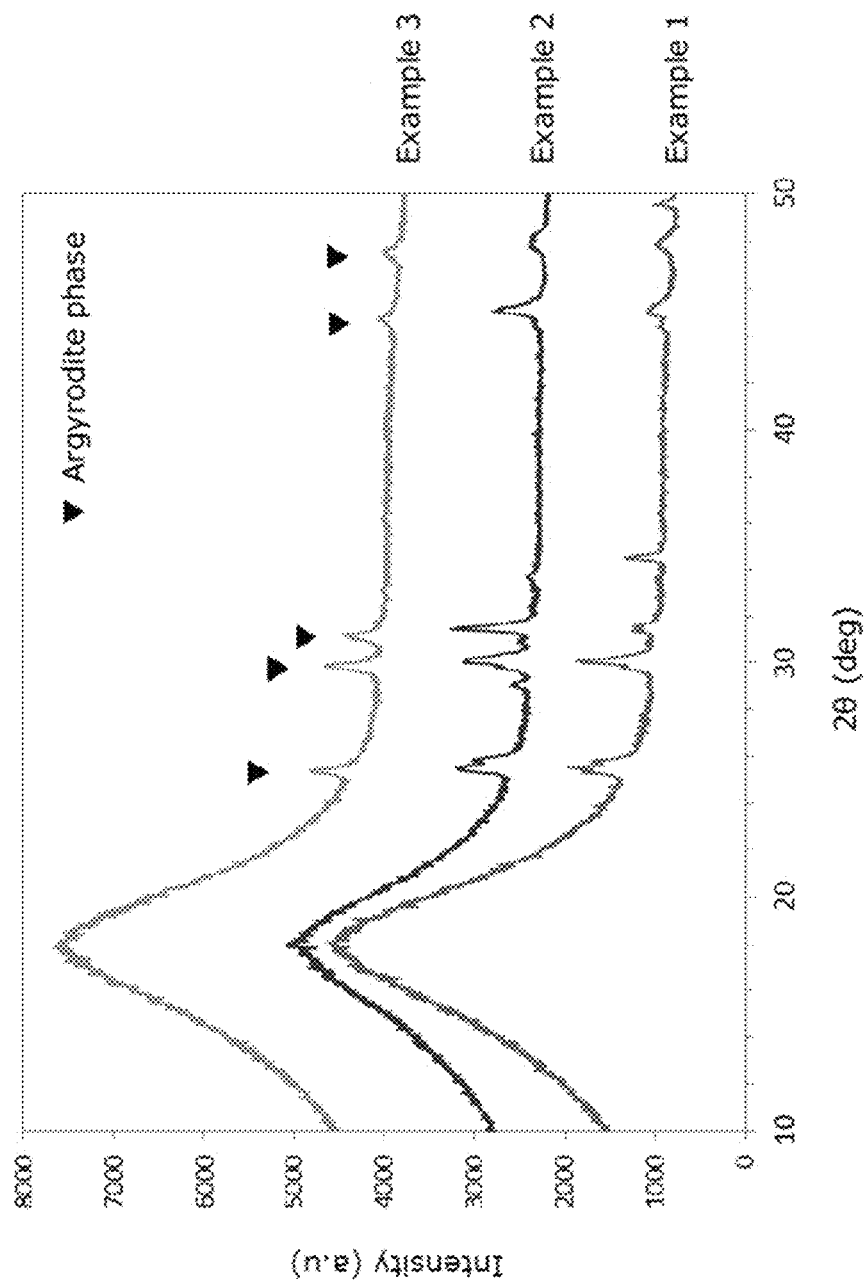
FIG. 1 is a diagram showing the X-ray diffraction patterns of the sulfide solid electrolytes produced in Examples 1 to 3.

The sulfide solid electrolyte of the present invention contains lithium (Li), phosphorus (P) and sulfur (S) elements; at least one halogen (X) element; and at least one metal (M) element having a first ionization energy of more than 520.2 KJ/mol and less than 1007.3 KJ/mol. The metal (M) element(s) having a first ionization energy of more than 520.2 KJ/mol and less than 1007.3 KJ/mol is/are hereinafter sometimes simply referred to as "metal (M) element(s)".

At least one halogen (X) element may be one halogen (X) element or two or more halogen (X) elements. At least one halogen (X) element can be selected from fluorine (F), chlorine (Cl), bromine (Br) and iodine (I) elements. From the viewpoint of improving the lithium ion conductivity, it is preferable that at least one halogen (X) element includes at least one of chlorine (Cl) and bromine (Br) elements, and from the viewpoint of improving the lithium ion conductivity and making materials low elastic, it is more preferable that at least one halogen (X) element includes two of chlorine (Cl) and bromine (Br) elements.

At least one metal (M) element may be one metal (M) element or two or more metal (M) elements. The first ionization energy of the metal (M) element(s) is more than 520.2 KJ/mol and less than 1007.3 KJ/mol. The first ionization energy is the minimum energy required when the outermost shell of an atom is deprived of one electron. $Li^+$ is easily stabilized by hydration due to its small radius, and it tends to decrease the lattice energy since it is monovalent and has small electrostatic attraction. Therefore, $Li^+$ tends to enhance the reactivity between the sulfide solid electrolyte and moisture. On the other hand, the metal (M) element(s) having a first ionization energy of more than 520.2 KJ/mol and less than 1007.3 KJ/mol form(s) cations having a larger ion radius than that of $Li^+$ or form(s) higher valence cations, and thus it/they tend(s) to decrease the reactivity between the sulfide solid electrolyte and moisture. Therefore, if a sulfide solid electrolyte containing lithium (Li), phosphorus (P), sulfur (S) and halogen (X) elements and also containing a crystal phase wherein, in an X-ray diffraction pattern measured with CuKα1 radiation, peaks are present at positions of 2θ=25.19°±1.00° and 29.62°±1.00°, is modified by partially substituting Li with a metal (M) element(s) having a first ionization energy of more than 520.2 KJ/mol and less than 1007.3 KJ/mol, this will make it is possible to suppress the generation of hydrogen sulfide gas more greatly compared with the sulfide solid electrolyte before substitution while maintaining the lithium ion conductivity of the sulfide solid electrolyte before substitution. The first ionization energy of the metal (M) element(s) is not particularly limited as long as it is more than 520.2 KJ/mol and less than 1007.3 KJ/mol, but is preferably 540 KJ/mol or more and 1000 KJ/mol or less, and more preferably 560 KJ/mol or more and 800 KJ/mol or less, from the viewpoint of more effectively suppressing the generation of hydrogen sulfide gas more greatly compared with the sulfide solid electrolyte before substitution while maintaining the lithium ion conductivity of the sulfide solid electrolyte before substitution.

The valence of cations formed by the metal (M) element(s) is usually 1, 2 or 3, and preferably 3. The higher the valence of cations formed by the metal (M) element(s) is, the more the lattice energy increases, resulting in improved water resistance of the sulfide solid electrolyte. Therefore, the sulfide solid electrolyte becomes unlikely to react with moisture, and it is possible to suppress the generation of hydrogen sulfide gas more effectively.

Examples of the metal (M) element(s) include silver (Ag), magnesium (Mg), calcium (Ca) and yttrium (Y) elements and the like, and of these, silver (Ag) and yttrium (Y) elements are preferable, and an yttrium (Y) element is more preferable, from the viewpoint of more effectively suppressing the generation of hydrogen sulfide gas while maintaining the lithium ion conductivity. The first ionization energies of the silver (Ag), magnesium (Mg), calcium (Ca) and yttrium (Y) elements are 731.0 KJ/mol, 737.3 KJ/mol, 589.6 KJ/mol and 615.6 KJ/mol, respectively.

The first ionization energies of Group 1 elements, namely, hydrogen (H), lithium (Li), sodium (Na), potassium (K), rubidium (Rb), cesium (Cs) and francium (Fr) elements are 1312.2 KJ/mol, 513.3 KJ/mol, 495.7 KJ/mol, 418.7 KJ/mol, 403.0 KJ/mol, 375.7 KJ/mol and 400.4 KJ/mol, respectively, and the first ionization energy of a mercury (Hg) element is 1007.3 KJ/mol. Therefore, the Group 1 elements and the mercury (Hg) element do not correspond to the metal (M) elements.

The contents of the lithium (Li), phosphorus (P), sulfur (S), halogen (X) and metal (M) elements in the sulfide solid electrolyte of the present invention can be appropriately adjusted, from the viewpoint of suppressing the generation of hydrogen sulfide gas while maintaining the lithium ion conductivity.

From the viewpoint of improving the lithium ion conductivity, the content of the phosphorus (P) element is preferably 7.4 mol % or more and 8.5 mol % or less, more preferably 7.6 mol % or more and 8.3 mol % or less, and still more preferably 7.9 mol % or more and 8.2 mol % or less, based on the total molar amount of the constituent elements of the sulfide solid electrolyte of the present invention.

From the viewpoint of improving the lithium ion conductivity, the molar ratio of the content of the lithium (Li) element to the content of the phosphorus (P) element is preferably 2.0 or more and 6.5 or less, more preferably 3.0 or more and 6.2 or less, still more preferably 4.0 or more and 5.8 or less, and still more preferably 4.6 or more and 5.5 or less.

From the viewpoint of improving the lithium ion conductivity, the molar ratio of the content of the sulfur (S) element to the content of the phosphorus (P) element is preferably 4.0 or more and 5.5 or less, more preferably 4.1 or more and 5.3 or less, still more preferably 4.2 or more and 5.0 or less, and still more preferably 4.3 or more and 4.6 or less.

From the viewpoint of improving the lithium ion conductivity, the molar ratio of the content of the halogen (X) element(s) to the content of the phosphorus (P) element is preferably 0.50 or more and 2.2 or less, more preferably 0.80 or more and 2.0 or less, still more preferably 1.0 or more and 1.9 or less, and still more preferably 1.4 or more and 1.8 or less. When the sulfide solid electrolyte of the present invention contains two or more halogen (X) elements, the "content of the halogen (X) element(s)" means the total content of the two or more halogen elements. The same applies throughout the present specification.

From the viewpoint of more effectively suppressing the generation of hydrogen sulfide gas while maintaining the lithium ion conductivity, the molar ratio of the content of the metal (M) element(s) to the content of the phosphorus (P) element is preferably more than 0 and 2.0 or less, more preferably 0.02 or more and 0.85 or less, still more preferably 0.04 or more and 0.75 or less, and still more preferably 0.08 or more and 0.65 or less. When the sulfide solid electrolyte of the present invention contains two or more metal (M) elements, the "content of the metal (M) element(s)" means the total content of the two or more metal (M) elements. The same applies throughout the present specification.

From the viewpoint of more effectively suppressing the generation of hydrogen sulfide gas while maintaining the lithium ion conductivity, the molar ratio of the total content of the lithium (Li) element and the metal (M) element(s) to the content of the phosphorus (P) element is preferably more than 2.2 and 6.7 or less, more preferably 4.4 or more and 6.2 or less, still more preferably 4.8 or more and 5.8 or less, and still more preferably 5.2 or more and 5.6 or less.

From the viewpoint of more effectively suppressing the generation of hydrogen sulfide gas while maintaining the lithium ion conductivity, the molar ratio of the content of the metal (M) element(s) to the content of the lithium (Li) element is preferably more than 0 and 1.0 or less, more preferably 0.001 or more and 0.6 or less, still more preferably 0.005 or more and 0.3 or less, and still more preferably 0.01 or more and 0.2 or less.

When the sulfide solid electrolyte of the present invention contains chlorine (Cl) and bromine (Br) elements, the molar ratio of the content of the chlorine (Cl) element to the total content of the chlorine (Cl) and bromine (Br) elements is preferably 0.1 or more and 0.9 or less, more preferably 0.2 or more and 0.8 or less, and still more preferably 0.3 or more and 0.7 or less.

The sulfide solid electrolyte of the present invention may contain impurities. From the viewpoint of preventing adverse effects on the performance of the sulfide solid electrolyte of the present invention, the content of the impurities is preferably less than 5 mol %, more preferably less than 3 mol %, and still more preferably less than 1 mol %, based on the total molar amount of the constituent elements of the sulfide solid electrolyte.

The molar amount of each of the elements contained in the sulfide solid electrolyte can be determined by using a known method such as inductively coupled plasma atomic emission spectroscopy (ICP-AES) or the like to measure the content of each of the elements in a solution obtained by dissolving the sulfide solid electrolyte by alkali fusion or the like.

In the X-ray diffraction pattern of the sulfide solid electrolyte of the present invention measured with CuKα1 radiation, peaks are present at positions of 2θ=25.19°±1.00° and 2θ=29.62°±1.00°. A crystal phase from which the peaks described above are derived is hereinafter sometimes referred to as a "crystal phase of the present invention". The sulfide solid electrolyte of the present invention may contain one crystal phase corresponding to the crystal phase of the present invention or two or more crystal phases each corresponding to the crystal phase of the present invention. It is preferable that the crystal phase of the present invention has an argyrodite-type crystal structure. The argyrodite-type crystal structure is a crystal structure possessed by a group of compounds derived from a mineral represented by the chemical formula: $Ag_8GeS_6$. The argyrodite-type crystal structure preferably belongs to a cubic crystal system. As a result of the fact that the crystal phase of the present invention has an argyrodite-type crystal structure, it is possible to suppress the generation of hydrogen sulfide effectively while maintaining the ionic conductivity. In other words, the present inventors have revealed metal elements particularly suitable for a sulfide solid electrolyte which has an argyrodite-type crystal structure as the crystal phase of the present invention. This is one of the characteristics of the present invention. For example, in a sulfide solid electrolyte consisting of glass ceramics, it undergoes a process in which metal elements are uniformly dispersed by vitrification, and thus it is believed that substitution is easy in any metal element. In contrast, in an argyrodite-type crystal structure prepared by a solid phase reaction, substitution is promoted in the case of particular metal elements.

The sulfide solid electrolyte of the present invention may be composed of the crystal phase of the present invention or may be composed of the crystal phase of the present invention and one or two or more other phases. The other phase(s) may be a crystal phase or an amorphous phase. Examples of the other phase(s) include $Li_2S$, LiCl, LiBr, $Li_3PS_4$ and $LiCl_{1-a}Br_a$ (0<a<1) phases and the like. When the sulfide solid electrolyte of the present invention is composed of the crystal phase of the present invention and one or two or more other phases, it is preferable that the crystal phase of the present invention is a main phase. The "main phase" means a phase having the largest content ratio based on the total content of all the crystal phases contained in the sulfide solid electrolyte of the present invention. The content ratio of the crystal phase of the present invention contained in the sulfide solid electrolyte of the present invention is preferably 60 mass % or more, more preferably 70 mass % or more, still more preferably 80 mass % or more, and still more preferably 90 mass % or more, based on all the crystal phases contained in the sulfide solid electrolyte of the present invention. The ratio of the crystal phases can be confirmed by, for example, an X-ray diffraction method (XRD).

In one embodiment, the sulfide solid electrolyte of the present invention has a composition represented by the following formula (I):

$$Li_aM_bPS_cX_d \qquad (I)$$

wherein X represents at least one halogen (X) element, M represents at least one metal (M) element, a represents 3.0 or more and 6.5 or less, b represents more than 0 and 6.5 or less, c represents 3.5 or more and 5.5 or less, and d represents 0.50 or more and 3.0 or less.

X is at least one halogen element selected from fluorine (F), chlorine (Cl), bromine (Br) and iodine (I) elements. An iodine (I) element tends to reduce the lithium ion conductivity, and a fluorine (F) element is difficult to be introduced in the crystal structure. Therefore, X is preferably at least one halogen element selected from chlorine (Cl) and bromine (Br) elements.

From the viewpoint of improving the lithium ion conductivity of the sulfide solid electrolyte of the present invention, a is preferably 3.0 or more and 6.5 or less, more preferably 3.5 or more and 6.3 or less, and still more preferably 4.0 or more and 6.0 or less. When a is 3.0 or more, it is possible to suppress a small Li content in the crystal structure, and as a result, it is possible to suppress the decrease in the lithium ion conductivity. On the other hand, when a is 6.5 or less, it is possible to suppress the decrease in the number of pores of the Li sites, and as a result, it is possible to suppress the decrease in the lithium ion conductivity.

From the viewpoint of improving the lithium ion conductivity of the sulfide solid electrolyte of the present invention, b is preferably 0.010 or more and 3.0 or less, more preferably 0.050 or more and 1.5 or less, and still more preferably 0.080 or more and 0.80 or less.

From the viewpoint of improving the lithium ion conductivity of the sulfide solid electrolyte of the present invention, c is preferably 3.5 or more and 5.5 or less, more preferably 4.0 or more and 5.3 or less, and still more preferably 4.2 or more and 5.0 or less.

From the viewpoint of improving the lithium ion conductivity of the sulfide solid electrolyte of the present invention, d is preferably 0.70 or more and 2.8 or less, more preferably 0.90 or more and 2.4 or less, and still more preferably 1.1 or more and 1.8 or less.

In formula (I), P may be partially substituted with one or two or more elements selected from silicon (Si), germanium (Ge), tin (Sn), lead (Pb), boron (B), aluminum (Al), gallium (Ga), arsenic (As), antimony (Sb) and bismuth (Bi) elements.

The fact that the sulfide solid electrolyte of the present invention contains the crystal phase of the present invention can be confirmed by an X-ray diffraction pattern measured with CuKα radiation. For example, CuKα1 radiation can be used as the CuKα radiation.

In the X-ray diffraction pattern of the sulfide solid electrolyte of the present invention measured with CuKα1 radiation, it is preferable that peaks are present at positions of 2θ=25.19°±1.00° and 2θ=29.62°±1.00°. These peaks are derived from the crystal phase of the present invention.

In the present specification, the "peak" means mainly the top of the peak. In the X-ray diffraction pattern, whether a peak is present in each range can be determined as follows. For example, regarding a peak present at a position of 2θ=25.19°±1.00°, in the X-ray diffraction pattern, the average value of the X-ray intensities (counts) at 2θ=(25.19°−1.0°)±0.5°, i.e., 2θ=24.19°±0.5° and at 2θ=(25.19°+1.0°)±0.5°, i.e., 2θ=26.19°±0.5° is defined as the intensity A of the background (BG), and the maximum value of the X-ray intensity (counts) at 25.19°±1.0° is defined as the peak intensity B, and if the ratio (B/A) is 1.01 or more, preferably 1.05 or more, and more preferably 1.10 or more, it can be determined that a peak is present at a position of 2θ=25.19°±1.00°. The same applies to determination of whether other peaks are present at predetermined positions or not. The X-ray intensities described above are values measured with the apparatus and under the conditions used in Examples described below.

In the X-ray diffraction pattern of the sulfide solid electrolyte of the present invention measured with CuKα1 radiation, it is more preferable that a peak(s) is/are present at one or two or more positions selected from 2θ=15.34°±1.00°, 17.74°±1.00°, 30.97°±1.00°, 44.37°±1.00°, 47.22°±1.00° and 51.70°±1.00° in addition to positions of 2θ=25.19°±1.00° and 29.62°±1.00°, it is further more preferable that peaks are present at all the positions of 2θ=30.97°±1.00°, 44.37°±1.00° and 47.22°±1.00° in addition to positions of 2θ=25.19°±1.00° and 29.62°±1.00°, it is further more preferable that peaks are present at all the positions of 2θ=15.34°±1.00°, 17.74°±1.00°, 30.97°±1.00°, 44.37°±1.00° and 47.22°±1.00° at positions of 2θ=25.19°±1.00° and 29.62°±1.00°, and it is further more preferable that peaks are present at all the positions of 2θ=15.34°±1.00°, 17.74°±1.00°, 30.97°±1.00°, 44.37°±1.00°, 47.22°±1.00° and 51.70°±1.00° in addition to positions of 2θ=25.19°±1.00° and 29.62°±1.00°. These peaks are derived from the crystal phase of the present invention.

Each of the positions of the peaks is represented by a median value ±1.00°, but preferably by a median value ±0.500°, and more preferably by a median value ±0.300°.

The sulfide solid electrolyte of the present invention is in the form of powder, for example. The median diameter $D_{50}$ of the sulfide solid electrolyte of the present invention can be appropriately adjusted. The median diameter $D_{50}$ of the sulfide solid electrolyte of the present invention is preferably 0.1 μm or more and 100 μm or less, and more preferably 0.2 μm or more and 10 μm or less. The median diameter $D_{50}$ is a particle size at a cumulative volume of 50% in a volume-based particle size distribution of the powder measured by a laser diffraction scattering particle size distribution measurement method.

<<Production Method of Sulfide Solid Electrolyte>>

The method of producing the sulfide solid electrolyte of the present invention is not particularly limited. A production method that can obtain a desired sulfide solid electrolyte as described above is preferable, and a known production method can be used. The method of producing the sulfide solid electrolyte of the present invention is described in Examples, and thus the descriptions thereof are omitted here.

<<Electrode Composite Material>>

The electrode composite material of the present invention contains the sulfide solid electrolyte of the present invention and an active material.

In one embodiment, the electrode composite material of the present invention is a negative-electrode composite material. When the active material is a negative-electrode active material, the electrode composite material of the present invention is a negative-electrode composite material.

Examples of the negative-electrode active material include carbon materials, metal materials and the like, and one of these can be used alone or two or more of these can be used in combination. Examples of the carbon materials and the metal materials include materials generally known as a negative-electrode active material, and thus the descriptions thereof are omitted here. The negative-electrode active material preferably has electron conductivity.

The mixing ratio of the sulfide solid electrolyte of the present invention and the negative-electrode active material (the sulfide solid electrolyte of the present invention: the negative-electrode active material) can be appropriately adjusted in consideration of electric capacity, electron conductivity (electron conduction path), ion conductivity (ion conduction path) and the like. The mixing ratio of the sulfide solid electrolyte of the present invention and the negative-electrode active material is, in a mass ratio, preferably 95:5 to 5:95, more preferably 90:10 to 10:90, and still more preferably 85:15 to 15:85.

The negative-electrode composite material may further contain a conductive auxiliary agent. If the electron conductivity of the negative-electrode active material is low, it is preferable that the negative-electrode composite material contains a conductive auxiliary agent. The conductive auxiliary agent is not particularly limited as long as it has lithium ion conductivity, but the electron conductivity is preferably $1 \times 10^3$ S/cm or more, and more preferably $1 \times 10^5$ S/cm or more. As the conductive auxiliary agent, a general material can be appropriately used, and thus the descriptions thereof are omitted here. The content of the conductive auxiliary agent can be appropriately adjusted in consideration of electric capacity, electron conductivity (electron conduction path), ion conductivity (ion conduction path) and the like, and is not particularly limited.

The negative-electrode composite material may contain a binder to closely bind the negative-electrode active material and the solid electrolyte to each other. As the binder, a general material can be appropriately used, and thus the descriptions thereof are omitted here.

The negative-electrode composite material can be produced by mixing, for example, the sulfide solid electrolyte with the negative-electrode active material, and optionally the conductive auxiliary agent and/or the binder. The mixing can be performed using, for example, a mortar, a ball mill, a bead mill, a jet mill, a planetary ball mill, a vibration ball mill, a sand mill, a cutter mill or the like. The mixing may be performed by a dry method or a wet method, but it is preferable that the mixing is performed by a wet method. The solvent used in the wet method is preferably an organic solvent.

In another embodiment, the electrode composite material of the present invention is a positive-electrode composite material. When a positive-electrode active material is used as the active material, the electrode composite material of the present invention is a positive-electrode composite material. The positive-electrode composite material can be obtained by mixing the sulfide solid electrolyte of the present invention with the positive-electrode active material.

The positive-electrode active material is a substance capable of inserting and removing lithium ions, and can be appropriately selected from known positive-electrode active materials. Examples of the positive-electrode active material include metal oxides and sulfides. Examples of the metal oxides include transition metal oxides and the like.

The positive-electrode composite material may further contain a conductive auxiliary agent. The descriptions concerning the conductive auxiliary agent are the same as those of the negative-electrode composite material.

The mixing ratio of the sulfide solid electrolyte of the present invention and the positive-electrode active material, and the descriptions concerning the method of producing the positive-electrode composite material are the same as those of the negative-electrode composite material.

<<Slurry>>

The slurry of the present invention contains the sulfide solid electrolyte of the present invention and a dispersion medium.

The content of the sulfide solid electrolyte of the present invention in the slurry of the present invention can be appropriately adjusted according to the purpose or the like of the slurry of the present invention. The slurry of the present invention can have various viscosities depending on the content of the sulfide solid electrolyte of the present invention, and can take various forms such as ink and paste depending on the viscosity. The slurry of the present invention can be used in the production of the battery of the present invention. The content of the sulfide solid electrolyte of the present invention in the slurry of the present invention is preferably 10 mass % or more and 90 mass % or less, more preferably 20 mass % or more and 80 mass % or less, still more preferably 30 mass % or more and 70 mass % or less, based on the total mass of the slurry of the present invention.

The dispersion medium contained in the slurry of the present invention is not particularly limited as long as the dispersion medium is a liquid capable of dispersing the sulfide solid electrolyte of the present invention. Examples of the dispersion medium include water, organic solvents and the like. The dispersion medium may be one kind of solvent or a mixture of two or more kinds of solvents.

<<Battery>>

The battery of the present invention is a battery including a positive electrode layer, a negative electrode layer and a solid electrolyte layer located between the positive electrode layer and the negative electrode layer, and the solid electrolyte layer contains the sulfide solid electrolyte of the present invention.

The battery of the present invention is preferably a solid-state battery, preferably a lithium solid-state battery. The lithium solid-state battery may be a primary battery or a secondary battery, but is preferably a lithium secondary battery. The solid-state battery includes not only an aspect of a solid-state battery containing no liquid substance or gel-like substance as an electrolyte, but also an aspect of a solid-state battery containing, for example, 50 mass % or less, 30 mass % or less, 10 mass % or less of a liquid substance or gel-like substance as an electrolyte. Examples of the form of the solid-state battery include a laminated type, a cylindrical type, a square type and the like.

The positive electrode layer is a layer containing a positive-electrode active material, and preferably a layer containing the positive-electrode composite material of the present invention.

The thickness of the positive electrode layer is preferably 0.01 mm or more and 10 mm or less. As the method of producing the positive electrode layer, the same method as a known method can be used.

The negative electrode layer is a layer containing a negative-electrode active material, and preferably a layer containing the negative-electrode composite material of the present invention. The thickness of the negative electrode layer is preferably 100 nm or more and 5 mm or less, more preferably 1 μm or more and 3 mm or less, and still more preferably 5 μm or more and 1 mm or less. As the method of producing the negative electrode layer, the same method as a known method can be used.

The electrolyte layer is a layer containing the sulfide solid electrolyte of the present invention. The electrolyte layer may contain a solid electrolyte other than the sulfide solid electrolyte of the present invention. The electrolyte layer may contain a binder. As the binder, the same binder as the binder of the negative-electrode composite material of the present invention can be used. The thickness of the electrolyte layer is preferably 0.001 mm or more and 1 mm or less. As the method of producing the electrolyte layer, the same method as a known method can be used.

The battery of the present invention preferably further includes a current collector.

The battery of the present invention can be produced by joining respective members. As the joint method, the same method as a known method can be used.

EXAMPLES

Example 1

(1) Production of Sulfide Solid Electrolyte

A $Li_2S$ powder, a $P_2S_5$ powder, a LiCl powder, a LiBr powder and a MgS powder were weighed so that the composition would be $Li_{4.8}Mg_{0.6}PS_{4.7}Cl_{0.8}Br_{0.8}$ and the total amount would be 5 g. To the mixture of these powders, heptane was added, and the mixture was pulverized and mixed for 10 hours using a wet pulverization mixing ball mill, and then dried in vacuum with a vacuum dryer to obtain a raw material powder. The resulting raw material powder was filled in a carbon container (40 mm×30 mm×20 mm, non-airtight) to a volume of 80 vol % and heated in a tubular electric furnace at 300° C. (product temperature) for 4 hours, and further heated at 500° C. (product temperature) for 4 hours while hydrogen sulfide gas ($H_2S$) was circulated at 1.0 L/min to obtain a sintered product. The temperature rise and fall rate was 200° C/hour. The sintered product thus obtained was subjected to crude pulverization using a mortar, and heptane was added. The product was pulverized and mixed for 3 hours using a wet pulverization mixing ball mill, and then sized through a stainless sieve having a mesh size of 1 μm to obtain a powdery sulfide solid electrolyte. The additive element used in Example 1 is Mg (first ionization energy of Mg: 737.3 KJ/mol), and the molar ratio of the Mg content to the Li content is 0.125.

The weighing, mixing, installation in an electric furnace, retrieval from the electric furnace, disintegration, and sizing processes described above were all performed in a glovebox replaced with sufficiently dried Ar gas (dew point of −60° C. or less).

The composition of the obtained sulfide solid electrolyte was measured by ICP emission spectrometry, confirming that the composition of the obtained sulfide solid electrolyte was $Li_{4.8}Mg_{0.6}PS_{4.7}Cl_{0.8}Br_{0.8}$.

The results of the analysis of the obtained sulfide solid electrolyte by an X-ray diffraction method (XRD) are shown in FIG. 1.

In the X-ray diffraction method, an XRD apparatus "RINT-TTRIII" manufactured by Rigaku Corporation was used under the conditions of scanning axis: 2θ/θ, scanning range: 5 to 80 deg, step size: 0.02 deg, and scanning rate: 20 deg/min. Specifically, a few drops of liquid paraffin were dropped onto the solid electrolyte powder in an argon atmosphere, and then the X-ray diffraction was performed in the atmosphere.

(2) Measurement of Generation Amount of Hydrogen Sulfide ($H_2S$)

In an argon atmosphere, 50 mg of the sulfide solid electrolyte powder in Example 1 obtained in the above (1) was weighed, and allowed to stand in a well-closed container (dry air with a volume of 1750 $cm^3$, a dew point of −30° C., a temperature of 25° C.). While circulating the air in the well-closed container using an air pump, the generation amount of hydrogen sulfide was measured using a hydrogen sulfide sensor (GX-2009 manufactured by RIKEN KEIKI Co., Ltd.). The volume of hydrogen sulfide generated until 1 hour after exposure of the solid electrolyte powder to dry air was measured. In Table 1, the generation amount of hydrogen sulfide is expressed as a value per unit mass of the solid electrolyte powder.

(3) Measurement of Electrical Conductivity

The sulfide solid electrolyte powder in Example 1 obtained in the above (1) was subjected to uniaxial pressing at a pressure of 200 MPa in a glovebox replaced with sufficiently dried Ar gas (dew point of −60° C. or less) to prepare a pellet having a diameter of 10 mm and a thickness of 2 to 5 mm. A carbon paste as an electrode was applied to both of the top surface and the bottom surface of the pellet, and then thermal treatment was performed at 180° C. for 30 minutes to prepare a sample for measurement of ion electrical conductivity. The ion electrical conductivity (unit: S/cm) was measured by the alternating current impedance method under the conditions of room temperature (25° C.) and a measurement frequency of 0.1 Hz to 1 MHz, using Solartron 1255B, an apparatus manufactured by TOYO Corporation.

The results of Example 1 are shown in Table 1.

Example 2

Except that a $Li_2S$ powder, a $P_2S_5$ powder, a LiCl powder, a LiBr powder and a CaS powder were weighed so that the composition would be $Li_{4.8}Ca_{0.6}PS_{4.7}Cl_{0.8}Br_{0.8}$ and the total amount would be 5 g, a powdery sulfide solid electrolyte was produced and the generation amount of hydrogen sulfide and the electrical conductivity were measured in the same manner as in Example 1. The additive element used in Example 2 is Ca (first ionization energy of Ca: 589.6 KJ/mol), and the molar ratio of the Ca content to the Li content is 0.125.

The composition of the sulfide solid electrolyte obtained in Example 2 was measured by ICP emission spectrometry, confirming that the composition of the obtained sulfide solid electrolyte was $Li_{4.8}Ca_{0.6}PS_{4.7}Cl_{0.8}Br_{0.8}$.

The results of the analysis of the sulfide solid electrolyte obtained in Example 2 by an X-ray diffraction method (XRD) are shown in FIG. 1. The XRD measurement conditions were the same as in Example 1.

The results of Example 2 are shown in Table 1.

Example 3

Except that a $Li_2S$ powder, a $P_2S_5$ powder, a LiCl powder, a LiBr powder and an $Ag_2S$ powder were weighed so that the composition would be $Li_{4.8}Ag_{0.6}PS_{4.4}Cl_{0.8}Br_{0.8}$ and the total amount would be 5 g, a powdery sulfide solid electrolyte was produced and the generation amount of hydrogen sulfide and the electrical conductivity were measured in the same manner as in Example 1. The additive element used in Example 3 is Ag (first ionization energy of Ag: 731.0 KJ/mol), and the molar ratio of the Ag content to the Li content is 0.125.

The composition of the sulfide solid electrolyte obtained in Example 3 was measured by ICP emission spectrometry, confirming that the composition of the obtained sulfide solid electrolyte was $Li_{4.8}Ag_{0.6}PS_{4.4}Cl_{0.8}Br_{0.8}$.

The results of the analysis of the sulfide solid electrolyte obtained in Example 3 by an X-ray diffraction method (XRD) are shown in FIG. 1. The XRD measurement conditions were the same as in Example 1.

The results of Example 3 are shown in Table 1.

Example 4

Except that a $Li_2S$ powder, a $P_2S_5$ powder, a LiCl powder, a LiBr powder and a $MgCl_2$ powder were weighed so that the composition would be $Li_{5.3}Mg_{0.1}PS_{4.4}Cl_{0.9}Br_{0.8}$ and the total amount would be 5 g, a powdery sulfide solid electrolyte was produced and the generation amount of hydrogen sulfide and the electrical conductivity were measured in the same manner as in Example 1. The additive element used in Example 4 is Mg (first ionization energy of Mg: 737.3 KJ/mol), and the molar ratio of the Mg content to the Li content is 0.019.

The composition of the sulfide solid electrolyte obtained in Example 4 was measured by ICP emission spectrometry, confirming that the composition of the obtained sulfide solid electrolyte was $Li_{5.3}Mg_{0.1}PS_{4.4}Cl_{0.9}Br_{0.8}$.

Figure 2:
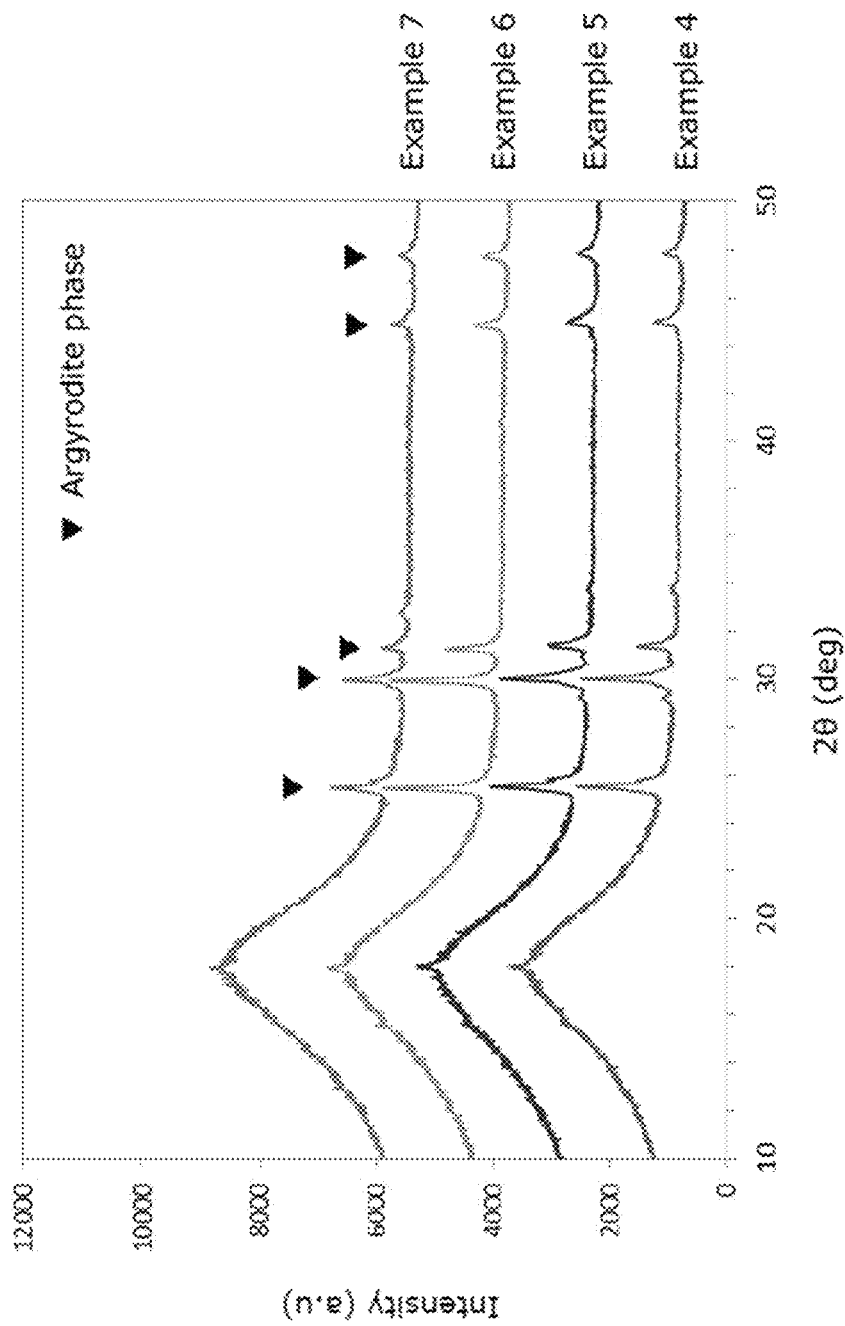
FIG. 2 is a diagram showing the X-ray diffraction patterns of the sulfide solid electrolytes produced in Examples 4 to 7.

The results of the analysis of the sulfide solid electrolyte obtained in Example 4 by an X-ray diffraction method (XRD) are shown in FIG. 2. The XRD measurement conditions were the same as in Example 1.

The results of Example 4 are shown in Table 1.

Example 5

Except that a $Li_2S$ powder, a $P_2S_5$ powder, a LiCl powder, a LiBr powder and a CaCl2 powder were weighed so that the composition would be $Li_{5.3}Ca_{0.1}PS_{4.4}Cl_{0.9}Br_{0.8}$ and the total amount would be 5 g, a powdery sulfide solid electrolyte was produced and the generation amount of hydrogen sulfide and the electrical conductivity were measured in the same manner as in Example 1. The additive element used in Example 5 is Ca (first ionization energy of Ca: 589.6 KJ/mol), and the molar ratio of the Ca content to the Li content is 0.019.

The composition of the sulfide solid electrolyte obtained in Example 5 was measured by ICP emission spectrometry, confirming that the composition of the obtained sulfide solid electrolyte was $Li_{5.3}Ca_{0.1}PS_{4.4}Cl_{0.9}Br_{0.8}$.

The results of the analysis of the sulfide solid electrolyte obtained in Example 5 by an X-ray diffraction method (XRD) are shown in FIG. 2. The XRD measurement conditions were the same as in Example 1.

The results of Example 5 are shown in Table 1.

Example 6

Except that a $Li_2S$ powder, a $P_2S_5$ powder, a LiCl powder, a LiBr powder and an AgCl powder were weighed so that the composition would be $Li_{5.3}Ag_{0.1}PS_{4.4}Cl_{0.8}Br_{0.8}$ and the total amount would be 5 g, a powdery sulfide solid electrolyte was produced and the generation amount of hydrogen sulfide and the electrical conductivity were measured in the same manner as in Example 1. The additive element used in Example 6 is Ag (first ionization energy of Ag: 731.0 KJ/mol), and the molar ratio of the Ag content to the Li content is 0.019.

The composition of the sulfide solid electrolyte obtained in Example 6 was measured by ICP emission spectrometry, confirming that the composition of the obtained sulfide solid electrolyte was $Li_{5.3}Ag_{0.1}PS_{4.4}Cl_{0.8}Br_{0.8}$.

The results of the analysis of the sulfide solid electrolyte obtained in Example 6 by an X-ray diffraction method (XRD) are shown in FIG. 2. The XRD measurement conditions were the same as in Example 1.

The results of Example 6 are shown in Table 1.

Example 7

Except that a $Li_2S$ powder, a $P_2S_5$ powder, a LiCl powder, a LiBr powder and a $Y_2S_3$ powder were weighed so that the composition would be $Li_{5.3}Y_{0.1}PS_{4.5}Cl_{0.8}Br_{0.8}$ and the total amount would be 5 g, a powdery sulfide solid electrolyte was produced and the generation amount of hydrogen sulfide and the electrical conductivity were measured in the same manner as in Example 1. The additive element used in Example 7 is Y (first ionization energy of Y: 615.6 KJ/mol), and the molar ratio of the Y content to the Li content is 0.019.

The composition of the sulfide solid electrolyte obtained in Example 7 was measured by ICP emission spectrometry, confirming that the composition of the obtained sulfide solid electrolyte was $Li_{5.3}Y_{0.1}PS_{4.5}Cl_{0.8}Br_{0.8}$.

The results of the analysis of the sulfide solid electrolyte obtained in Example 7 by an X-ray diffraction method (XRD) are shown in FIG. 2. The XRD measurement conditions were the same as in Example 1.

The results of Example 7 are shown in Table 1.

Example 8

Except that a $Li_2S$ powder, a $P_2S_5$ powder, a LiCl powder and a $MgCl_2$ powder were weighed so that the composition would be $Li_{5.7}Mg_{0.1}PS_{4.8}Cl_{1.3}$ and the total amount would be 5 g, that argon (Ar) gas instead of hydrogen sulfide gas was circulated at 0.5 L/min in a tubular electric furnace, and that the electrical conductivity was measured as follows, a powdery sulfide solid electrolyte was produced and the generation amount of hydrogen sulfide and the electrical conductivity were measured in the same manner as in Example 1. The additive element used in Example 8 is Mg (first ionization energy of Mg: 737.3 KJ/mol), and the molar ratio of the Mg content to the Li content is 0.017.

The electrical conductivity was measured as follows. The sulfide solid electrolyte powder obtained in Example 8 was subjected to uniaxial pressing under a load of about 6 t/cm² in a glovebox replaced with sufficiently dried argon gas (dew point of −60° C. or less) to prepare a sample for measurement of lithium ion conductivity consisting of a pellet having a diameter of 10 mm and a thickness of about 1 mm to 8 mm. The lithium ion conductivity was measured by the alternating current impedance method under the conditions of a temperature of 25° C., a frequency of 100 Hz to 1 MHz and an amplitude of 100 mV, using Solartron 1255B manufactured by TOYO Corporation.

The composition of the sulfide solid electrolyte obtained in Example 8 was measured by ICP emission spectrometry, confirming that the composition of the obtained sulfide solid electrolyte was $Li_{5.7}Mg_{0.1}PS_{4.8}Cl_{1.3}$.

Figure 4:
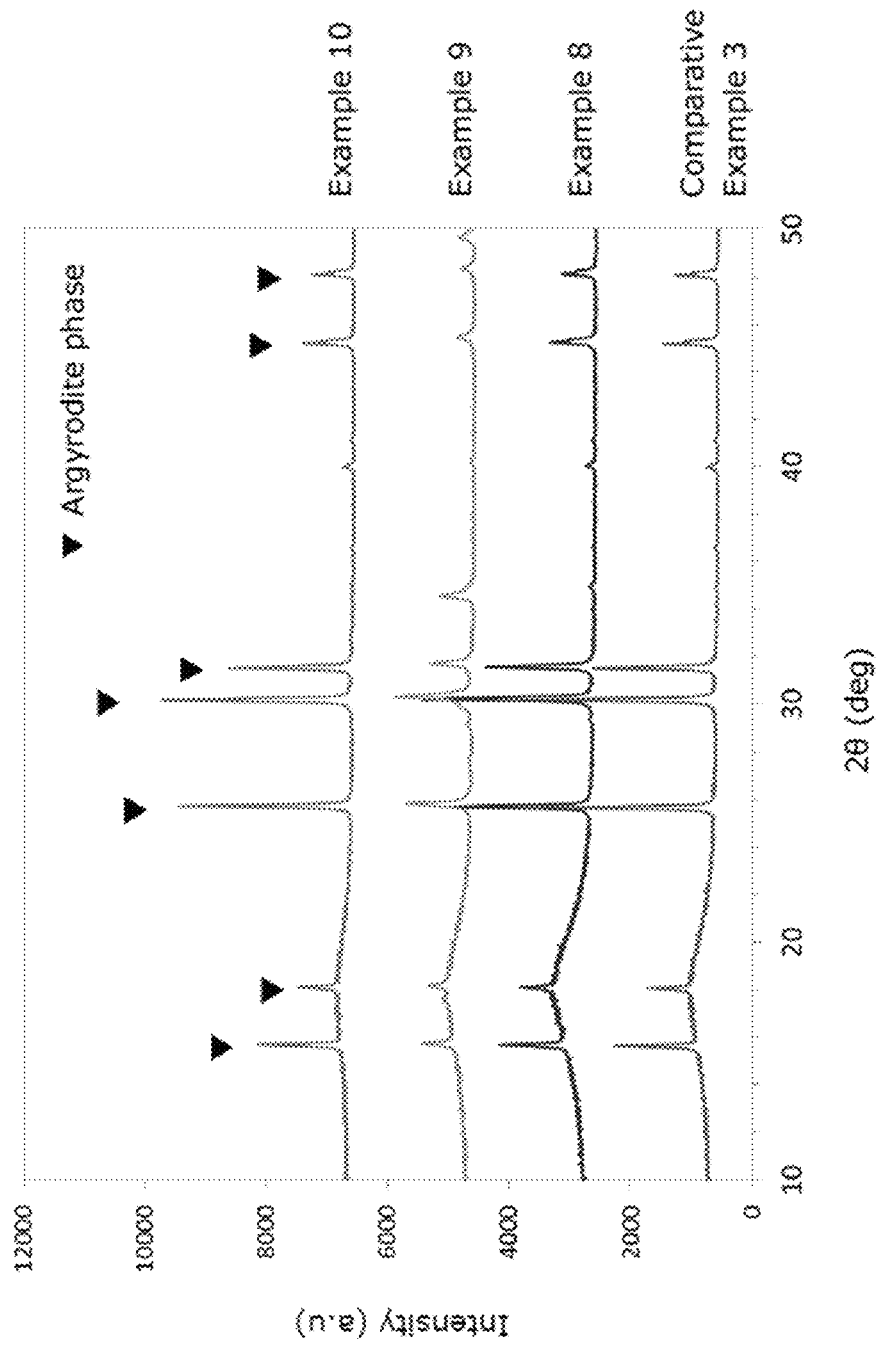
FIG. 4 is a diagram showing the X-ray diffraction patterns of the sulfide solid electrolytes produced in Examples 8 to 10 and Comparative Example 3.

The results of the analysis of the sulfide solid electrolyte obtained in Example 8 by an X-ray diffraction method (XRD) are shown in FIG. 4. The XRD measurement conditions were the same as in Example 1. As shown in FIG. 4, when the sulfide solid electrolyte obtained in Example 8 was analyzed by an X-ray diffraction method (XRD), peaks were present at positions of 2θ=25.19°±1.00°, 29.62°±1.00°, 30.97°±1.00°, 44.37°±1.00° and 47.22°±1.00°, like the sulfide solid electrolyte obtained in Examples 1 to 7. Due to a small background intensity, peaks present at positions of 2θ=15.34°±1.00° and 17.74°±1.00° could also be observed.

The results of Example 8 are shown in Table 2.

Example 9

Except that a $Li_2S$ powder, a $P_2S_5$ powder, a LiCl powder and a $MgCl_2$ powder were weighed so that the composition would be $Li_{5.2}Mg_{0.6}PS_{4.8}Cl_{1.8}$ and the total amount would be 5 g, that argon (Ar) gas instead of hydrogen sulfide gas was circulated at 0.5 L/min in a tubular electric furnace, and that the electrical conductivity was measured in the same manner as in Example 8, a powdery sulfide solid electrolyte was produced and the generation amount of hydrogen sulfide and the electrical conductivity were measured in the same manner as in Example 1. The additive element used in Example 9 is Mg (first ionization energy of Mg: 737.3 KJ/mol), and the molar ratio of the Mg content to the Li content is 0.115.

The composition of the sulfide solid electrolyte obtained in Example 9 was measured by ICP emission spectrometry, confirming that the composition of the obtained sulfide solid electrolyte was $Li_{5.2}Mg_{0.6}PS_{4.8}Cl_{1.8}$.

The results of the analysis of the sulfide solid electrolyte obtained in Example 9 by an X-ray diffraction method (XRD) are shown in FIG. 4. The XRD measurement conditions were the same as in Example 1. When the sulfide solid electrolyte obtained in Example 9 was analyzed by an X-ray diffraction method (XRD), peaks were present at positions of 2θ=25.19°±1.00°, 29.62°±1.00°, 30.97°±1.00°, 44.37°±1.00° and 47.22°±1.00°, like the sulfide solid electrolyte obtained in Examples 1 to 7. Due to a small background intensity, peaks present at positions of 2θ=15.34°±1.00° and 17.74°±1.00° could also be observed.

The results of Example 9 are shown in Table 2.

Example 10

Except that a $Li_2S$ powder, a $P_2S_5$ powder, a LiCl powder and a $MgCl_2$ powder were weighed so that the composition would be $Li_{5.6}Mg_{0.1}PS_{4.8}Cl_{1.2}$ and the total amount would be 5 g, that argon (Ar) gas instead of hydrogen sulfide gas was circulated at 0.5 L/min in a tubular electric furnace, and that the electrical conductivity was measured in the same manner as in Example 8, a powdery sulfide solid electrolyte was produced and the generation amount of hydrogen sulfide and the electrical conductivity were measured in the same manner as in Example 1. The additive element used in Example 10 is Mg (first ionization energy of Mg: 737.3 KJ/mol), and the molar ratio of the Mg content to the Li content is 0.018.

The composition of the sulfide solid electrolyte obtained in Example 10 was measured by ICP emission spectrometry, confirming that the composition of the obtained sulfide solid electrolyte was $Li_{5.6}Mg_{0.1}PS_{4.8}Cl_{1.2}$.

The results of the analysis of the sulfide solid electrolyte obtained in Example 10 by an X-ray diffraction method (XRD) are shown in FIG. 4. The XRD measurement conditions were the same as in Example 1. When the sulfide solid electrolyte obtained in Example 10 was analyzed by an X-ray diffraction method (XRD), peaks were present at positions of $2\theta=25.19°\pm1.00°$, $29.62°\pm1.00°$, $30.97°\pm1.00°$, $44.37°\pm1.00°$ and $47.22°\pm1.00°$, like the sulfide solid electrolyte obtained in Examples 1 to 7. Due to a small background intensity, peaks present at positions of $2\theta=15.34°\pm1.00°$ and $17.74°\pm1.00°$ could also be observed.

The results of Example 10 are shown in Table 2.

Comparative Example 1

Except that a $Li_2S$ powder, a $P_2S_5$ powder, a LiCl powder, a LiBr powder, a $Na_2S$ powder and a NaCl powder were weighed so that the composition would be $Li_{4.8}Na_{0.6}PS_{4.4}Cl_{0.8}Br_{0.8}$ and the total amount would be 5 g, a powdery sulfide solid electrolyte was produced and the generation amount of hydrogen sulfide and the electrical conductivity were measured in the same manner as in Example 1. The additive element used in Comparative Example 1 is Na (first ionization energy of Na: 495.7 KJ/mol), and the molar ratio of the Na content to the Li content is 0.019.

The composition of the sulfide solid electrolyte obtained in Comparative Example 1 was measured by ICP emission spectrometry, confirming that the composition of the obtained sulfide solid electrolyte was $Li_{4.8}Na_{0.6}PS_{4.4}Cl_{0.8}Br_{0.8}$.

Figure 3:
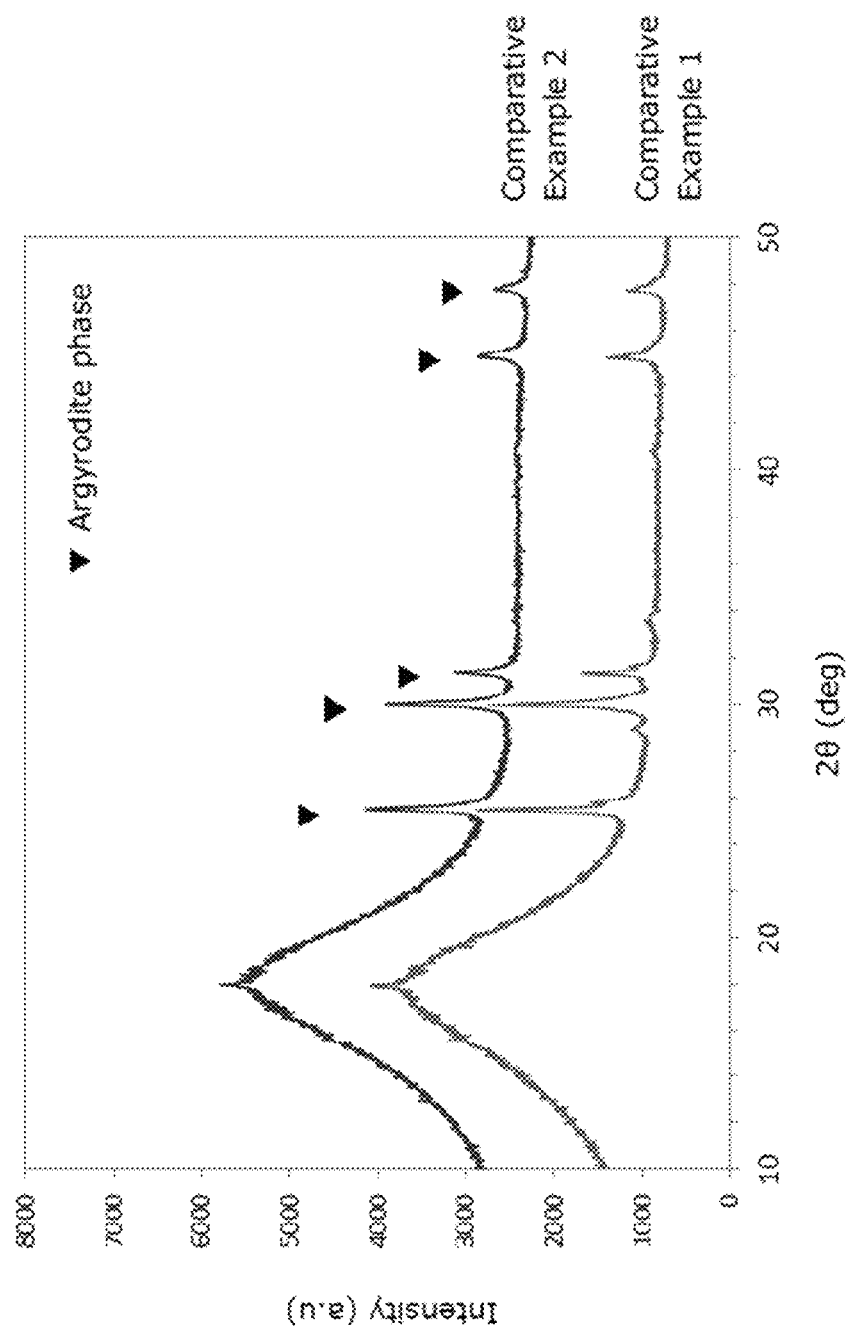
FIG. 3 is a diagram showing the X-ray diffraction patterns of the sulfide solid electrolytes produced in Comparative Examples 1 and 2.

The results of the analysis of the sulfide solid electrolyte obtained in Comparative Example 1 by an X-ray diffraction method (XRD) are shown in FIG. 3. The XRD measurement conditions were the same as in Example 1.

The results of Comparative Example 1 are shown in Table 1.

Comparative Example 2

Except that a $Li_2S$ powder, a $P_2S_5$ powder, a LiCl powder and a LiBr powder were weighed so that the composition would be $Li_{5.4}PS_{4.4}Cl_{0.8}Br_{0.8}$ and the total amount would be 5 g, a powdery sulfide solid electrolyte was produced and the generation amount of hydrogen sulfide and the electrical conductivity were measured in the same manner as in Example 1. No additive element was used in Comparative Example 2.

The composition of the sulfide solid electrolyte obtained in Comparative Example 2 was measured by ICP emission spectrometry, confirming that the composition of the obtained sulfide solid electrolyte was $Li_{5.4}PS_{4.4}Cl_{0.8}Br_{0.8}$.

The results of the analysis of the sulfide solid electrolyte obtained in Comparative Example 2 by an X-ray diffraction method (XRD) are shown in FIG. 3. The XRD measurement conditions were the same as in Example 1.

The results of Comparative Example 2 are shown in Table 1.

Comparative Example 3

Except that a $Li_2S$ powder, a $P_2S_5$ powder and a LiCl powder were weighed so that the composition would be $Li_{5.8}PS_{4.8}Cl_{1.2}$ and the total amount would be 5 g, that argon (Ar) gas instead of hydrogen sulfide gas was circulated at 0.5 L/min in a tubular electric furnace, and that the electrical conductivity was measured in the same manner as in Example 8, a powdery sulfide solid electrolyte was produced and the generation amount of hydrogen sulfide and the electrical conductivity were measured in the same manner as in Example 1. No additive element was used in Comparative Example 3.

The composition of the sulfide solid electrolyte obtained in Comparative Example 3 was measured by ICP emission spectrometry, confirming that the composition of the obtained sulfide solid electrolyte was $Li_{5.8}PS_{4.8}Cl_{1.2}$.

The results of the analysis of the sulfide solid electrolyte obtained in Comparative Example 3 by an X-ray diffraction method (XRD) are shown in FIG. 4. The XRD measurement conditions were the same as in Example 1. When the sulfide solid electrolyte obtained in Comparative Example 3 was analyzed by an X-ray diffraction method (XRD), peaks were present at positions of $2\theta=25.19°\pm1.00°$, $29.62°\pm1.00°$, $30.97°\pm1.00°$, $44.37°\pm1.00°$ and $47.22°\pm1.00°$, like the sulfide solid electrolyte obtained in Comparative Examples 1 and 2. Due to a small background intensity, peaks present at positions of $2\theta=15.34°\pm1.00°$ and $17.74°\pm1.00°$ could also be observed.

The results of Comparative Example 3 are shown in Table 2.

TABLE 1

|  | | Additive element | | | Generation |
| --- | --- | --- | --- | --- | --- |
|  | Composition formula | Type | Additive element/Li (molar ratio) | Electrical conductivity (S/cm) | amount of hydrogen sulfide (mL/g) |
| Example 1 | $Li_{4.8}Mg_{0.6}PS_{4.7}Cl_{0.8}Br_{0.8}$ | Mg | 0.125 | $1.14 \times 10^{-3}$ | 0.13 |
| Example 2 | $Li_{4.8}Ca_{0.6}PS_{4.7}Cl_{0.8}Br_{0.8}$ | Ca | 0.125 | $6.76 \times 10^{-4}$ | 0.14 |
| Example 3 | $Li_{4.8}Ag_{0.6}PS_{4.4}Cl_{0.8}Br_{0.8}$ | Ag | 0.125 | $2.56 \times 10^{-3}$ | 0.14 |
| Example 4 | $Li_{5.3}Mg_{0.1}PS_{4.4}Cl_{0.9}Br_{0.8}$ | Mg | 0.019 | $2.16 \times 10^{-3}$ | 0.17 |
| Example 5 | $Li_{5.3}Ca_{0.1}PS_{4.4}Cl_{0.9}Br_{0.8}$ | Ca | 0.019 | $5.61 \times 10^{-4}$ | 0.16 |
| Example 6 | $Li_{5.3}Ag_{0.1}PS_{4.4}Cl_{0.8}Br_{0.8}$ | Ag | 0.019 | $4.44 \times 10^{-3}$ | 0.16 |
| Example 7 | $Li_{5.3}Y_{0.1}PS_{4.5}Cl_{0.8}Br_{0.8}$ | Y | 0.019 | $2.97 \times 10^{-3}$ | 0.09 |
| Comparative Example 1 | $Li_{4.8}Na_{0.6}PS_{4.4}Cl_{0.8}Br_{0.8}$ | Na | 0.019 | $3.33 \times 10^{-3}$ | 0.24 |
| Comparative Example 2 | $Li_{5.4}PS_{4.4}Cl_{0.8}Br_{0.8}$ | None | 0 | $4.08 \times 10^{-3}$ | 0.39 |

TABLE 2

|  | Composition formula | Additive element | | Electrical conductivity (S/cm) | Generation amount of hydrogen sulfide (mL/g) |
|---|---|---|---|---|---|
|  |  | Type | Additive element/Li (molar ratio) |  |  |
| Example 8 | $Li_{5.7}Mg_{0.1}PS_{4.8}Cl_{1.3}$ | Mg | 0.017 | $2.38 \times 10^{-3}$ | 0.86 |
| Example 9 | $Li_{5.2}Mg_{0.6}PS_{4.8}Cl_{1.8}$ | Mg | 0.115 | $2.18 \times 10^{-3}$ | 0.55 |
| Example 10 | $Li_{5.6}Mg_{0.1}PS_{4.8}Cl_{1.2}$ | Mg | 0.018 | $2.99 \times 10^{-3}$ | 0.94 |
| Comparative Example 3 | $Li_{5.8}PS_{4.8}Cl_{1.2}$ | None | 0 | $3.35 \times 10^{-3}$ | >1.05* |

*Above the measurement limit

As shown in Tables 1 and 2, in Examples 1 to 10, in a sulfide solid electrolyte containing phosphorus, sulfur and halogen elements and also containing a crystal phase wherein, in an X-ray diffraction pattern measured with CuKα1 radiation, peaks are present at positions of 2θ=25.19°±1.00° and 29.62°±1.00°, by partially substituting Li with metal elements (Ag, Mg, Ca, Y) having a first ionization energy of more than 520.2 KJ/mol and less than 1007.3 KJ/mol, it was possible to suppress the generation of hydrogen sulfide gas more greatly compared with the sulfide solid electrolyte before substitution while maintaining the lithium ion conductivity of the sulfide solid electrolyte before substitution.

The invention claimed is:

1. A sulfide solid electrolyte, comprising:
   lithium (Li), phosphorus (P) and sulfur (S) elements;
   at least one halogen (X) element; and
   at least one metal (M) element having a first ionization energy of more than 520.2 KJ/mol and less than 1007.3 KJ/mol,
   wherein, in an X-ray diffraction pattern measured with CuKα1 radiation, peaks are present at all positions of 2θ=15.34°±1.00°, 17.74°±1.00°, 25.19 °±1.00°, 29.62°±1.00°, and 30.97°±1.00°,
   wherein a molar ratio of a total content of the lithium (Li) element and the metal (M) element to a content of the phosphorus (P) element is 2.2 or more and 6.7 or less, and
   wherein the at least one metal (M) element comprises at least one of silver (Ag), magnesium (Mg), calcium (Ca), and yttrium (Y) elements.

2. The sulfide solid electrolyte according to claim 1, wherein:
   a molar ratio of a content of the lithium (Li) element to the content of the phosphorus (P) element is 2.0 or more and 6.5 or less;
   a molar ratio of a content of the sulfur (S) element to the content of the phosphorus (P) element is 4.0 or more and 5.5 or less;
   a molar ratio of a content of the at least one halogen (X) element to the content of the phosphorus (P) element is 0.50 or more and 2.2 or less; and
   a molar ratio of a content of the metal (M) element to the content of the phosphorus (P) element is more than 0 and 2.0 or less.

3. The sulfide solid electrolyte according to claim 1, wherein a molar ratio of a content of the metal (M) element to a content of the lithium (Li) element is more than 0 and 1.0 or less.

4. The sulfide solid electrolyte according to claim 1, wherein the at least one halogen (X) element comprises at least one of chlorine (Cl) and bromine (Br) elements.

5. The sulfide solid electrolyte according to claim 1, wherein the sulfide solid electrolyte has a composition represented by the following formula:

$$Li_aM_bPS_cX_d$$

wherein X represents the at least one halogen (X) element, M represents the at least one metal (M) element, a represents 3.0 or more and 6.5 or less, b represents more than 0 and 2.0 or less, c represents 3.5 or more and 5.5 or less, and d represents 0.50 or more and 3.0 or less.

6. The sulfide solid electrolyte according to claim 1, wherein, in the X-ray diffraction pattern, a peak is present at a position selected from 2θ=44.37°±1.00°, 47.22°±1.00°, and 51.70°±1.00°.

7. An electrode composite material, comprising the sulfide solid electrolyte according to claim 1 and an active material.

8. A slurry, comprising the sulfide solid electrolyte according to claim 1 and a dispersion medium.

9. A battery, comprising a positive electrode layer, a negative electrode layer and a solid electrolyte layer located between the positive electrode layer and the negative electrode layer,
   wherein the solid electrolyte layer comprises the sulfide solid electrolyte according to claim 1.

10. The sulfide solid electrolyte according to claim 1, wherein
    the sulfide solid electrolyte includes a crystal phase having an argyrodite-type crystal structure.

11. The sulfide solid electrolyte according to claim 1, wherein
    the at least one metal (M) element includes at least one of a silver (Ag) element and a yttrium (Y) element.

* * * * *